US012023795B1

(12) United States Patent
Yaski

(10) Patent No.: US 12,023,795 B1
(45) Date of Patent: Jul. 2, 2024

(54) STORAGE BELT ATTACHMENT AND ASSOCIATED METHOD(S)

(71) Applicant: Jud Yaski, Eutawville, SC (US)

(72) Inventor: Jud Yaski, Eutawville, SC (US)

( * ) Notice: Subject to any disclaimer, the term of this patent is extended or adjusted under 35 U.S.C. 154(b) by 310 days.

(21) Appl. No.: 17/475,210

(22) Filed: Sep. 14, 2021

Related U.S. Application Data

(60) Provisional application No. 63/165,886, filed on Mar. 25, 2021, provisional application No. 63/079,713, filed on Sep. 17, 2020.

(51) Int. Cl.
*B25F 5/00* (2006.01)
*A45F 5/02* (2006.01)
*B25F 5/02* (2006.01)
*A41D 13/00* (2006.01)

(52) U.S. Cl.
CPC .............. *B25F 5/029* (2013.01); *A45F 5/021* (2013.01); *A41D 13/0012* (2013.01)

(58) Field of Classification Search
CPC ... B25F 5/029; A45F 2200/0575; B25H 3/003
USPC .................................................. 224/904, 223
See application file for complete search history.

(56) References Cited

U.S. PATENT DOCUMENTS 4,508,221 A * 4/1985 Olson ..................... B25F 5/029 206/478
5,881,434 A * 3/1999 Rigney ................ B43K 23/001 24/11 R
6,098,558 A * 8/2000 Baird ...................... B25F 5/029 112/475.08
6,910,578 B2 * 6/2005 Stern ...................... B25H 3/003 211/69.1
7,658,307 B2 * 2/2010 Skupin .................... A45F 5/004 224/675
8,066,268 B2 * 11/2011 Brauer .................... B25F 5/029 269/130
9,687,067 B2 * 6/2017 Calman ................. H01F 7/0252
2002/0014507 A1 * 2/2002 Snider ....................... A45F 5/02 224/904
2007/0059114 A1 * 3/2007 Grimes, II .............. B25F 5/029 224/183
2017/0095921 A1 * 4/2017 Madsen .................. B25F 5/029
2020/0214414 A1 * 7/2020 Caldwell ................ A45C 13/02

* cited by examiner

*Primary Examiner* — Scott T McNurlen
(74) *Attorney, Agent, or Firm* — Ashkan Najafi

(57) ABSTRACT

A storage belt attachment having a plurality of pockets formed with an elastic strip stretched across the pockets to make them particularly suitable for storing construction items such as drill bits. The attachment includes a first strip having a rigid fabric having a width and a length, an elastic second strip overlaid and stretched taut on a first surface of the first strip and connected to the first strip by a plurality of parallel seams set at equidistant intervals along the length of the first strip, thereby forming a plurality of pockets, and a third strip including a rigid fabric overlaid across a top end of the elastic second strip length to form an opening at a top entrance at the width of each pocket.

16 Claims, 5 Drawing Sheets

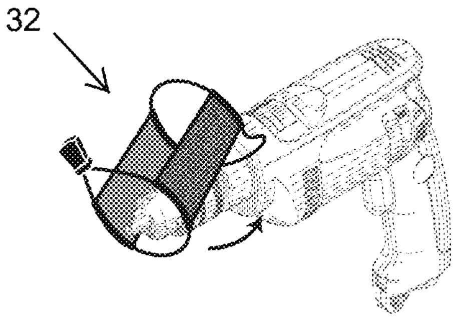

1. INTRODUCE DRILL'S CHUCK IN THE LARGEST ELASTIC (THE ONE WITH THE LOOP). ADJUST THE LOWE PART OF THAT ELASTIC TO THE POINTED SPOT, WHERE THE TRIGGER WILL BE SAFE

FIG. 6

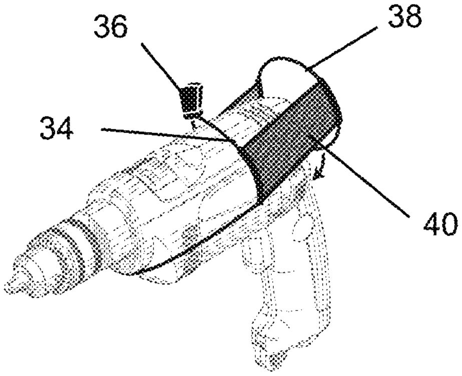

2. PULL THE SHORTER ELASTIC TO THE BACK PART OF THE DRILL AND ADJUST IT TO THE POINTED SPOT

FIG. 6a

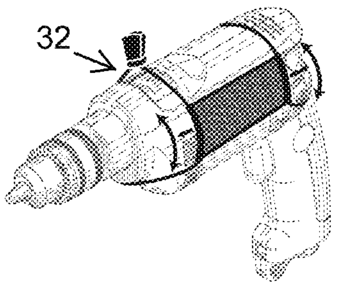

3. ONCE THE ELASTIC IS SECURED ON THE DRILL, ADJUST THE VELCRO ON DESIRED POSITION BY PULLING IT UP OR DOWN

FIG. 6b

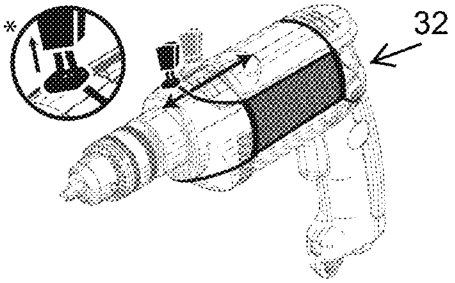

4. SLIDE FRONT OR BACK THE TOP PART OF THE LARGEST ELASTIC TO ADJUST IT IN CASE THERE IS A SWITCH ON THE DRILL AND *TIGHT WITH THE LOOP IN A SAFE SPOT

FIG. 6c

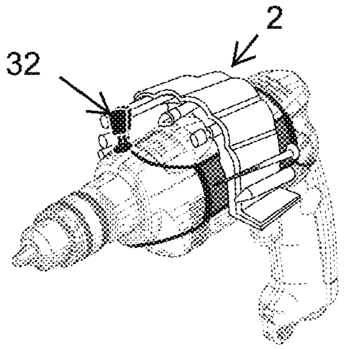

5. ATTACH THE BIT HOLSTER USING THE VELCRO BANDS.

NOTE: IF THE DRILL HAS A SWITCH AT THE TOP, YOU CAN LET SOME ROOM BY ADJUSTING THE VECRO BANDS AS NEEDED.

FIG. 6d

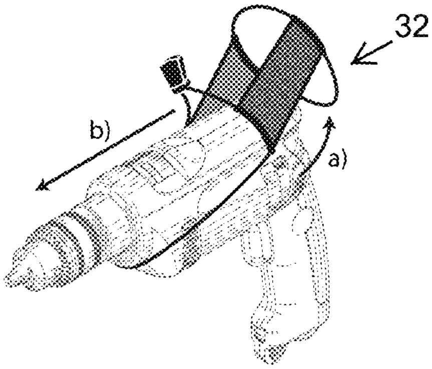

6. TO REMOVE FROM THE DRILL:
a) LOOSE THE SHORTER ELASTIC FROM BACK TO THE DRILL.
b) SLIDE FROM BACK TO FRONT OF THE DRILL.

FIG 6e

STORAGE BELT ATTACHMENT AND ASSOCIATED METHOD(S)

CROSS REFERENCE TO RELATED APPLICATIONS

This is a non-provisional patent application that claims priority to and benefit of U.S. provisional patent application nos. 63/165,886 filed Mar. 25, 2021, and 63/079,713 filed Sep. 17, 2020, each is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

The present disclosure relates generally to storage solutions for small items. More specifically, the present disclosure relates to a belt attachment having a plurality of pockets and which a user may attach to a construction tool or to a wearable belt.

Prior Art

A person carrying out building or construction work, or even performing regular DIY, will often require various sizes and shapes of drill bit to complete their task. Some drills come with holders for these pieces, but many do not, forcing a user to carry the bits in a toolbelt or pocket which can be uncomfortable. Additionally other tools such as a jigsaw or a Sawzall or nail gun may have sharp attachments or components that have the same effect.

There have been some attempts by products on the market to overcome this problem, however none achieve an ergonomically convenient solution, furthermore, they do not provide a way of simultaneously carrying other building materials such as screws and nails that may not fit in a sleeve.

Accordingly, a need remains for power tool belt attachment in order to overcome at least one aforementioned shortcoming. The exemplary embodiment(s) satisfy such a need by providing belt attachment having a plurality of pockets that are convenient and easy to use, lightweight yet durable in design, versatile in its applications, and configured for attachment to a construction tool or to a wearable belt.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a storage belt attachment having a plurality of pockets and is removably attachable to a construction tool or to a wearable belt. These and other objects, features, and advantages of the non-limiting exemplary embodiment(s) are provided by a storage belt attachment having a plurality of pockets formed with an elastic strip stretched across the pockets to make them particularly suitable for storing construction items such as drill bits. The storage belt attachment of the present disclosure is further configured to be easily mountable to a construction tool, metallic surface, or to a user's belt depending on which is more convenient for the user. Furthermore, multiple storage belts can be stacked together in a nested system.

Thus, according to a first aspect of the present disclosure, there is provided an apparatus for holding drill bits and accessories, the apparatus comprising: a first strip including stiff fabric having a width and a length; an elastic second strip overlaid and stretched taut on a first surface of the first strip and connected to the first strip by a plurality of parallel seams set at regular intervals along the length of the first strip, thereby forming a plurality of pockets; and a third strip including stiff fabric overlaid across a top end of the elastic second strip length to form an opening at a top entrance of each pocket.

In some embodiments, a fourth strip including stiff fabric is overlaid across an opposing bottom end of the elastic second strip length to form an opening at a bottom entrance of each pocket. Furthermore, each bottom entrance may be smaller in width than each respective top entrance. As an example, the openings on the top and bottom are preferably the same size to accommodate a convention drill bit. The elastic middle portion of the pocket is smaller and stretched tight so the drill bit slides into the open pocket entrance and gets held tight by the elastic middle portion of the pocket.

In some embodiments of the disclosure, an opposing second surface of the first strip has attached thereto a plurality of loops for mounting the apparatus to a belt.

In some embodiments of the disclosure, the first strip comprises at least one cavity proximate to the end of the length of the first strip, and at least one magnet is enclosed within the cavity, the thickness of the fabric between the magnet and the first surface of the first strip being thin enough to allow for objects to be magnetically attached to the first surface by the resultant magnetic pull. The apparatus may comprise a similar magnet configuration at each end of the length of the first strip. Furthermore, the magnets are configured to magnetically attach the apparatus to a metallic object or surface.

In some embodiments of the disclosure, each end of the first strip further comprises a malleable metallic support frame defining a ridge or lip at the ends of the strip to prevent magnetically attached accessories from coming loose.

The magnets may be self-adhering and configured to join one end of the first strip to the other end in a loop.

In some embodiments of the disclosure, the second strip is formed at least partially of elastic material such that the open-ended pockets each have at least one elastic entrance. In some embodiments, the pockets may have both ends open.

In some embodiments, the magnets are configured such that multiple apparatus stacked atop one another are magnetically attracted to allow easy formation of a nested system for storage purposes.

In a preferred embodiment, the pockets each have two open ends, with a top opening wider than the opposing bottom opening.

In some embodiments of the disclosure, the first strip is formed of a nylon webbing at least 2 millimeters in thickness.

In some embodiments of the disclosure, an opposing second surface of the first strip comprises self-adhering straps configured to join to one another, such as for example VELCRO™ straps.

In some embodiments, the apparats further comprises an elastic band or fabric strip overlaid over the top of each the pockets.

In some embodiments of the disclosure, the pockets formed by the storage belt may each comprise one or more magnets to increase the storage space and magnetic field strength, allowing additional screws or other metallic objects that do not fit inside the pockets to be stored on the outer surface of the pockets.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 5:
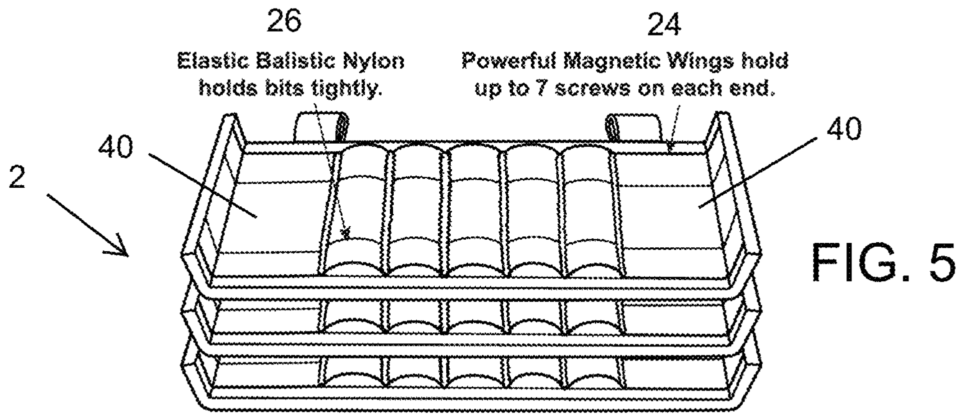
FIG. 5 illustrates a perspective view of a plurality of storage belt attachments stacked on each other.
Figure 5A:
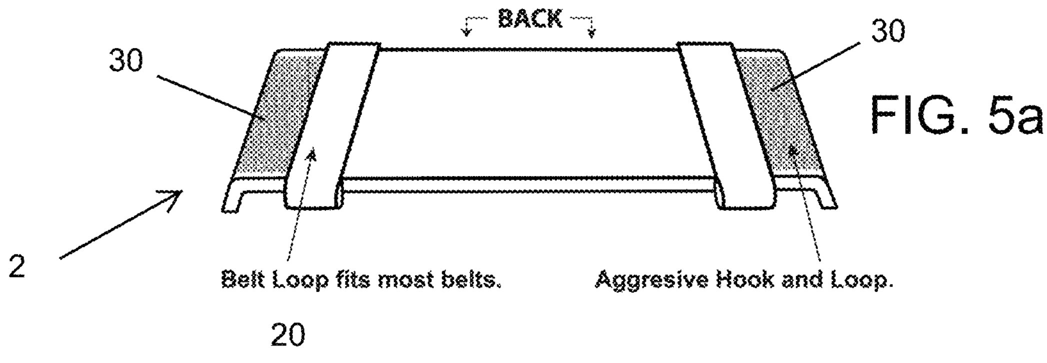

FIG. 5*a* illustrates a perspective view of a back side of a FIG. 5 storage belt attachment having belt loops and hook and loop fasteners; and FIG. 6 illustrates a first step for adjustably engaging a first loop of an elastic band about a distal end of a portable power tool wherein a section of the hook and loop fastener is slidably displaced along a longitudinal length of the elastic bands;

FIG. 6*a* illustrates a second step for adjustably engaging a second loop of the elastic band about a rear of the portable power tool;

FIG. 6*b* illustrates a third step that adjustably positions a section of a hook and loop fasteners to a desired position along the first loop and second loop;

FIG. 6*c* illustrates a fourth step that adjustably positions a top fastener portion of the elastic band to a desired position;

FIG. 6*d* illustrates a fifth step that adjustably positions the storage belt attachment to the hook and loop fasteners of the elastic band; and FIG. 6*e* illustrates a sixth step that removes the elastic band from the portable power tool.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

The terms "bit holster," "bit holder," "storage belt attachment," "power tool belt attachment" and variations thereof are synonymously used throughout the present disclosure.

The terms "VELCRO" and "hook and loop fasteners" are synonymously used throughout the present disclosure.

The terms "elastic band" and "harness" are synonymously used throughout the present disclosure.

The non-limiting exemplary embodiment(s) is/are referred to generally in FIGS. 1-6*e* and is/are intended to provide a portable power tool belt attachment 2 (e.g., bit holster, storage belt attachment) having a plurality of pockets for holding drill bits, wherein the attachment 2 may be removably attached to a construction tool or to a wearable belt. The portable power tool belt attachment 2 is fitted to a drill including magnets 40 that are removably affixed to metal surfaces of a power tool wherein the magnets 40 that attach to the power tool surface multiply in force based on a principle of magnetic force when multiple units are stacked on each other. When this happens the nature of the magnets 40 allow more weight to be stacked, allowing more weight to be stacked in combination than alone, therefore allowing the use of a stackable system on a power tool.

In a non-limiting exemplary embodiment, the bit holster 2 fits on the body of the power drill over the motor, and has a bend in the magnetic wing 24 (flange) from putting steel inside fabric to create a ledge. Such a ledge provides an enhanced tool holding surface acting against gravity and also facilitates the stackable feature of the bit holster 2 by using the compound magnetic force to allow the holster 2 to provide a stronger hold (e.g., heavier the magnets 40 get from stacking on each other). Such drill bit holster 2 also integrates belt loops 20 and loose outer pockets edges while elastic is stretched tight in pocket body, creating resistance to stop drill bits and the like from falling out.

In a non-limiting exemplary embodiment, an elastic band 32 (e.g., harness) is secured to a front and a rear of the power drill via VELCRO™ (hook and loop fasteners) and provides an addition support surface to maintain drill bit holster 2 at a substantially stable position on the power drill. The elastic band 32 (harness) is adjustably in length for accommodating a variety of power drills.

In a non-limiting exemplary embodiment, bent metal edges (e.g., wings 24, flanges) with magnets 40 are disposed inside fabric and located at opposed lateral ends of the bit holster 2 to prevent items from sliding off the magnetic wings 24.

In a non-limiting exemplary embodiment, each pocket may have a wide non-elastic entrance hole and a tight elastic center to grab items as they go into the pockets, while allowing easy ingress and egress from the entrance holes.

In a non-limiting exemplary embodiment, the bit holder 2 that is designed to both go on a drill, and also wear on your belt.

In a non-limiting exemplary embodiment, an elastic band 32 is wrapped (circumscribed) around the power drill to removably hold drill bit holster 2 with VELCRO™ on each side, so you do not need to glue the VELCRO™ to drill.

In a non-limiting exemplary embodiment, the drill bit holder 2 (storage belt attachment 2) includes magnets 40, pockets with the aforementioned unique structural features, and the aforementioned fabric holder 2 utilizing a magnet 40 and bent metal inside fabric to retain it. Such a structural configuration yields the new, useful, and unpredicted result of enabling a variety of tool accessories and drill bits to be stored on the power tool by solving the problem of premature detachment thereof.

In a non-limiting exemplary embodiment, the same magnets 40 that hold the tool accessories on one side of the drill bit holder 2 are used to secure multiple drill bit holders 2 to each other to allow a modular stacking system.

Figure 1:
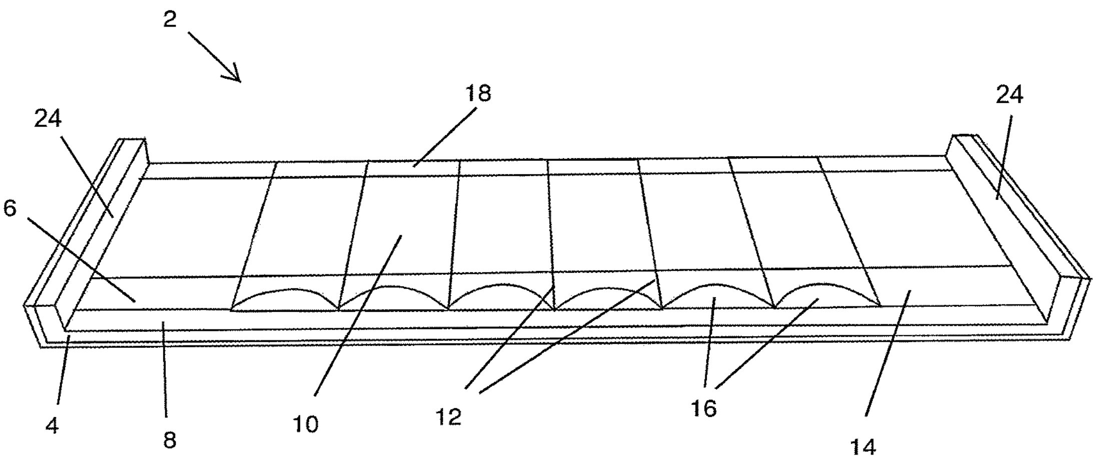
FIG. 1 illustrates a perspective view of a front side of an example configuration of a storage belt attachment according to the present disclosure.

Referring to FIG. 1, a perspective view of a front side of an example configuration of a storage belt attachment 2 (e.g., drill bit holder) according to the present disclosure is shown. The storage belt attachment 2 is formed of strips of fabric having different material properties and dimensions sewn together. A thick, stiff fabric forms the first strip 4 of the attachment 2, providing a stable yet flexible base for the other parts to be attached to. The first strip 4 may, for example, be 2.5 millimeters in thickness or greater and formed of, for example, NYLON™ webbing 26.

A second strip 6 of elastic fabric is sewn on to a first surface 8 of the first strip 4 to form a plurality of open-ended tunnels which may act as pockets for inserting small construction and do-it-yourself (DIY) items such as drill bits of different sizes. The second strip 6 of fabric is stretched taut before being overlaid over the first strip 4, in order to apply elastic pressure to any item inserted into the pockets, thereby holding it in place. The tunnels or pockets 10 are formed into rows spanning the width of the belt attachment 2 by a plurality of seams 12, which can for example comprise sewn seams. Such a structural configuration yields the new, useful, and unpredicted result of enabling quick ingress/egress of the drill bits by solving the problem of having to stretch the open end of each pocket.

A third thin strip of material 14, which is preferably of a much smaller width than the length of the pockets 10 is then overlaid across one end of the tunnels/pockets and the stiffness of the third strip 14 is used to create openings 16 at one of the ends of the tunnels/pockets.

Optionally, a fourth strip 18 of thin rigid fabric can be overlaid across the opposing ends of the tunnels/pockets to create second openings. The third strip 14 forms the "top" openings of the pockets and the fourth strip 18 forms the "bottom" openings of the pockets. In a preferred embodiment, the bottom openings may be smaller in width than the top openings 16.

Alternatively, the bottom of the pockets may simply be sewn shut with no strip overlaid.

In a preferred embodiment of the disclosure, as perhaps best shown in FIGS. 1-6*e*, the pockets 10 do not span the entire width of the belt attachment 2, but instead allow for gaps between the row of pockets and the ends of the belt attachment 2. This free space on the fabric strips is used to form a cavity where one or more magnets 40 are sewn or held in place by the fabric. The magnets 40 are strong enough to apply an attractive magnetic force through the fabric that can be felt on the first surface 8, thereby allowing any loose metallic items such as nails or screws are held in place on the surface above the magnets 40, at gaps on either side of the row of pockets 10. The magnets 40 may be any type of magnet that is suitable, such as for example neodymium magnets.

These magnets 40 can in fact have a second purpose, which is the attachment of the storage belt attachment 2 to a construction tool, via magnetic attraction between the magnets 40 and a metallic part of the construction tool, or simply attachment 2 of the storage belt to a metallic surface. In such embodiments, the magnets 40 have suitable strength to stably maintain the storage belt attachment 2 and any items carried therein to the construction tool, for example a drill that is currently in use by a user. Such magnets 40 may even be self-adhering and serve the purpose of attaching one end of the storage belt attachment 2 to the other end by magnetic attraction. As perhaps best shown in FIGS. 1-6*e*, the magnets 40 of these "wings 24" of the storage belt can have a third purpose. If the polarities of the magnets 40 of multiple storage belts are aligned in the same manner, then stacking the belts with the magnets 40 on each side aligned causes them to magnetically attract one another, forming a nested system of stacked belts. Such a structural configuration yields the new, useful, and unpredicted result of enabling multiple drill bit holsters 2 to be stacked on each other. Because the magnets 40 are encased in cloth, the metallic surface may be finished such as a vehicle body and not get damaged from the metal or magnets enclosed in the storage belt.

This is not only convenient for storage and transportation purposes of the storage belts themselves, but also allows for stacks of magnets 40 to be created to generate a higher strength magnetic field, effectively creating a larger magnet 40 and on either side of the belt stack and enabling heavier metallic objects to be stored on the belt stack.

Additional magnets 40 can be sewn into or otherwise incorporated into the pockets themselves to allow further metallic items to be stored on the outer surfaces of the pockets.

In a preferred embodiment, additional attachment 2 elements are provided at each end of the storage belt on the opposing second surface, the same side as the loops 20 for the belt, such as for example hook and loop (e.g., VELCRO™) straps which, when paired to an adjoining strip that may be attached to the body of a drill or other tool, attach the storage belt in place on the body of the tool or other object.

The first strip 4 may include a metal support sewn into either one or both ends of the belt attachment 2 allowing for structural changes to be made and maintained at the ends having the metal support incorporated. For example, as illustrated in FIG. 1, the ends may be formed into ridges (wedges, flanges, wings 24, lips) that would assist in preventing any loose items held in place by the magnets 40 from falling away from the storage belt attachment 2.

Another optional feature would be the inclusion of an elastic band 32 or fabric strip (not illustrated) over the tops of the pockets to press down along the middle and provide additional support for holding bits stored in the pockets in place.

Figure 2:
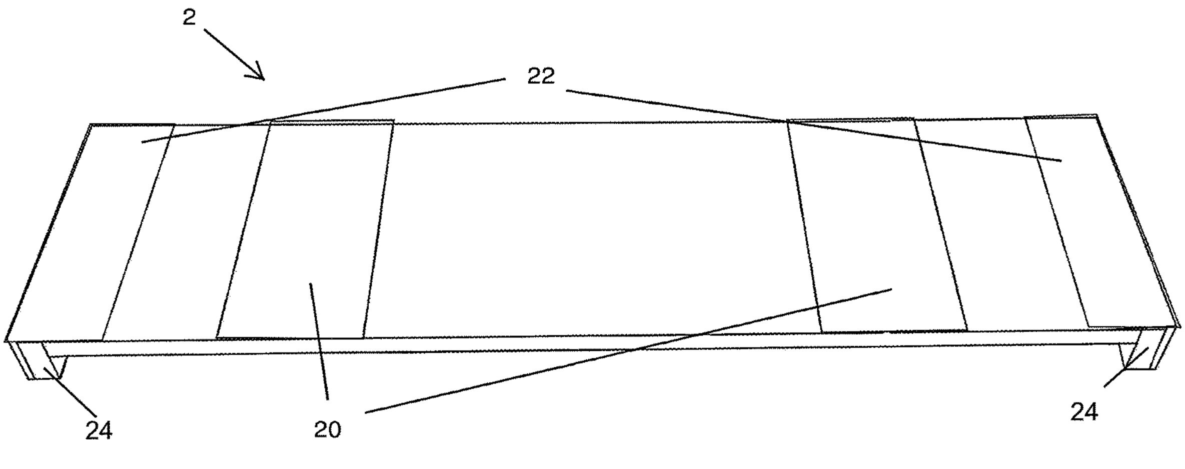
FIG. 2 illustrates a perspective view of a back side of an example configuration of a storage belt attachment according to the present disclosure.

Referring to FIG. 2. a perspective view of a back side of an example configuration of a storage belt attachment 2 according to the present disclosure is shown. The loops 20 on the back of the storage belt are shown, as well as adhesive straps 22 which can be VELCRO™ (hook and loop fasteners) straps. Adhesive straps allows the storage belt of the present disclosure to be attached to non-metallic tools.

Figure 3:
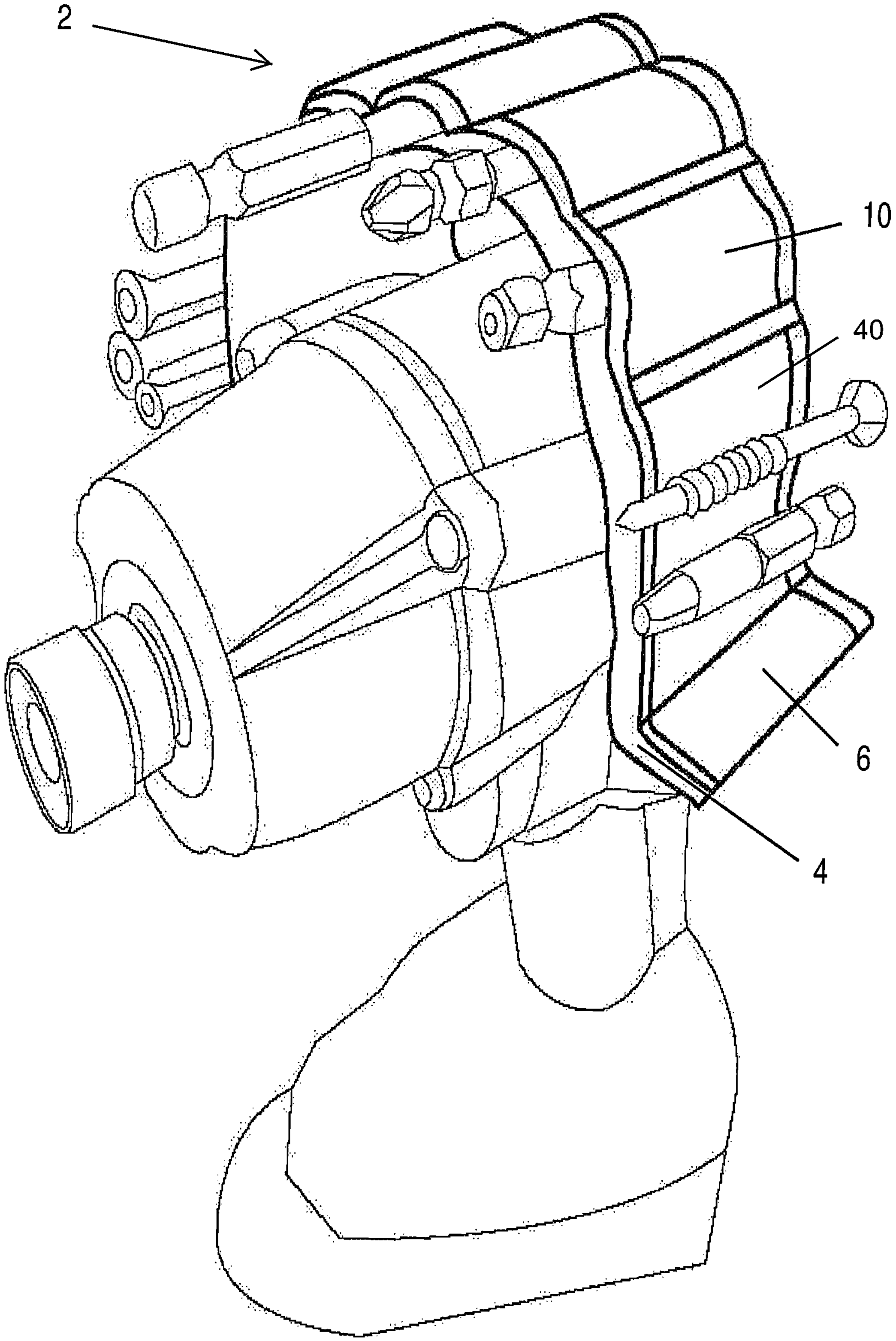
FIG. 3 illustrates a perspective view of an example configuration of a storage belt attachment according to the present disclosure in use for storing objects and being mounted on a construction tool for ease of access.
Figure 4:
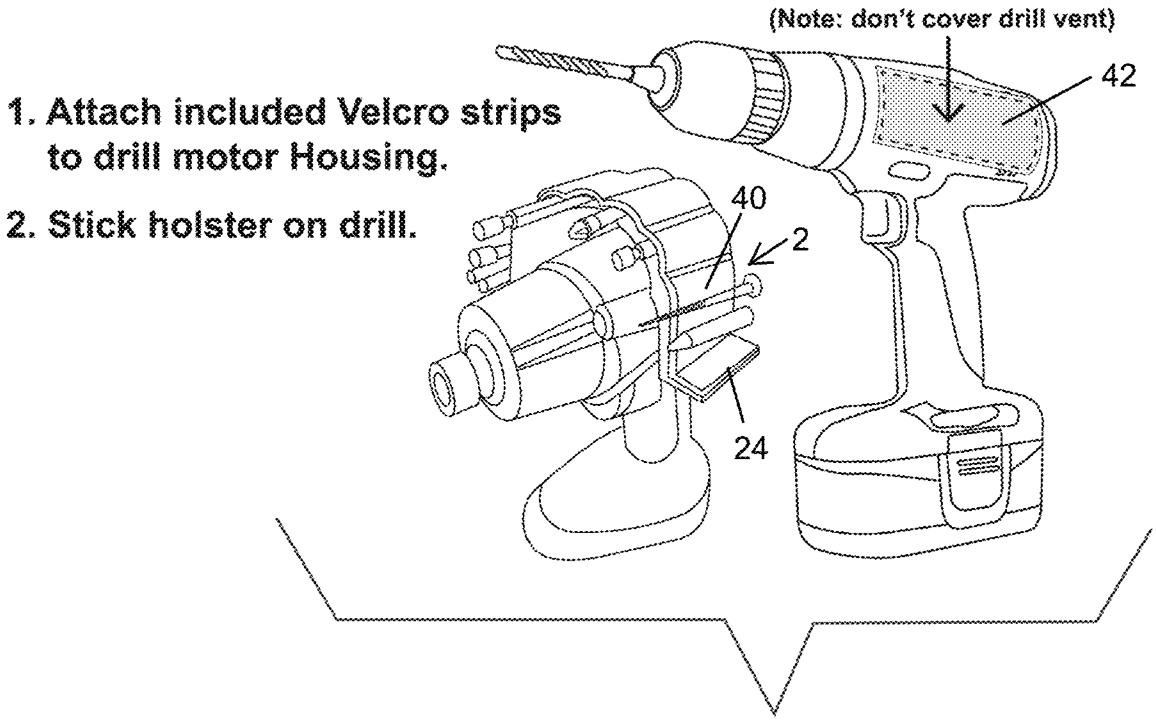
FIG. 4 illustrates perspective views of how the storage belt attachment can be connected to exemplary portable power tools.

Referring to FIG. 3, a perspective view of an example configuration of a storage belt attachment 2 according to the present disclosure is shown in use storing objects and mounted on a construction tool for ease of access. As can be seen, the best location to mount such a belt on a drill and many other small hand tools, for ease and ergonomic comfort is at the top near the motor. This allows quick changes of accessories stored in the apparatus.

Furthermore, the storage belt of the present disclosure is shown being configured to allow a space for a user's hand to fit underneath the storage belt when mounted as such on a drill, allowing them to reach switches for controlling the power drill, which are often mounted on the top. This arch configuration can be achieved by making the storage belt attachment 2 sufficiently long and rigid to create an arch when mounted to a standard drill. Such a structural configuration yields the new, useful, and unpredicted result of one-handed power drill operation without having to repetitively adjust a position of the bit holster 2 relative to the power drill.

Referring to FIGS. 6-6*e*, the power tool attachment 2 further includes an elastic harness 32 removably coupled to the power tool. Such an elastic harness 32 includes a first elastic looped band 34 having a fastener 36 attached thereto, a second elastic looped band 38 spaced from the first elastic looped band 34, and a first section 40 of a hook and loop fastener intermediately positioned between the first elastic looped band 34 and the second elastic looped band 38. Advantageously, the first section 40 of the hook and loop fastener is adjustably and slidably displaced along a longitudinal length of each the first elastic looped band 34 and the second elastic looped band 38. In this manner, a second section 42 30 of a hook and loop fastener is adjustably affixed to the power tool and removably attached to the first section 40 of the hook and loop fastener, thereby avoiding operation buttons and motor ventes of the power tool.

As illustrated, the storage belt attachment 2 is equipped with one or more fabric loops 20 that can both serve to mount the attachment 2 to a construction device or, if the user finds it more convenient, allow attachment 2 to a user's wearable belt. Alternative attachment mechanisms to the loops 20 could be used, such as for example VELCRO™ (hook and loop fasteners) attachments or other self-adhering mechanisms.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A power tool attachment for holding drill bits and tool accessories, the power tool attachment comprising:

a first strip including a fabric having a width and a length;

an elastic second strip overlaid and stretched taut on a first surface of the first strip and connected to the first strip by a plurality of parallel seams set at equidistant intervals along the length of the first strip, thereby forming a plurality of pockets;

a third strip including a fabric overlaid across a top end of the elastic second strip length to form an opening at a top entrance at the width of each pocket; and an elastic harness removably coupled to the power tool, said elastic harness including a first elastic looped band having a fastener attached thereto, a second elastic looped band spaced from the first elastic looped band, and a first section of a hook and loop fastener intermediately positioned between said first elastic looped band and said second elastic looped band;

wherein said first section of said hook and loop fastener is adjustably and slidably displaced along a longitudinal length of each said first elastic looped band and said second elastic looped band;

wherein a second section of a hook and loop fastener is removably coupled to the power tool via said first section of said hook and loop fastener.

2. The power tool attachment according to claim 1, further comprising: a fourth strip including a fabric overlaid across an opposing bottom end of a length of the elastic second strip form an opening at a bottom entrance at the width of each pocket.

3. The power tool attachment according to claim 2, wherein each said bottom entrance is smaller in width than each respective said top entrance.

4. The power tool attachment according to claim 1, wherein an opposing second surface of the first strip has attached thereto a plurality of loops for mounting the power tool attachment to a belt.

5. The power tool attachment according to claim 1, wherein the first strip comprises: at least one cavity proximate to an end of the length of the first strip, and at least one magnet is enclosed within the cavity, the thickness of the fabric between the magnet and the first surface of the first strip being thin enough to allow objects to be magnetically attached to the first surface by the resultant magnetic pull.

6. The power tool attachment according to claim 5, wherein the power tool attachment comprises: a plurality of magnets disposed at each end of the length of the first strip.

7. The power tool attachment according to claim 6, wherein the plurality of magnets are further configured to magnetically attach the power tool attachment to a metallic surface or object.

8. The power tool attachment according to claim 6, wherein each end of the first strip further comprises: a malleable metallic support frame defining a ridge or lip at the ends of the strip to prevent magnetically attached accessories from detaching from the strip.

9. The power tool attachment according to claim 6, wherein the plurality of magnets are self-adhering and configured to join one end of the first strip to the other end in a loop.

10. The power tool attachment according to claim 6, wherein the power tool attachment is of a sufficient length and rigidity that, when mounted atop a power tool, the power tool attachment is configured to form an arch space over the top of the power tool.

11. The power tool attachment according to claim 6, wherein the plurality of magnets are configured such that multiple power tool attachments stacked atop one another are magnetically attracted to allow easy formation of a nested system for storage purposes.

12. The power tool attachment according to claim 1, wherein the second strip includes elastic material such that the open-ended pockets each have at least one elastic entrance.

13. The power tool attachment according to claim 1, wherein the first strip includes synthetic polymer webbing at least 2 millimeters in thickness.

14. The power tool attachment according to claim 1, wherein an opposing second surface of the first strip comprises: self-adhering straps at each end of the power tool attachment which are configured to join to one another or to any other opposing self-adhering straps.

15. The power tool attachment according to claim 1, further comprising: an elastic band or fabric strip overlaid over the top of each of the pockets.

16. A power tool attachment for holding drill bits and tool accessories, the power tool attachment comprising:

a first strip including a fabric having a width and a length;

an elastic second strip overlaid and stretched taut on a first surface of the first strip and connected to the first strip by a plurality of parallel seams set at equidistant intervals along the length of the first strip, thereby forming a plurality of pockets; and a third strip including a fabric overlaid across a top end of the elastic second strip length to form an opening at a top entrance at the width of each pocket;

wherein the first strip includes at least one cavity proximate to an end of the length of the first strip, and at least one magnet is enclosed within the cavity, the thickness of the fabric between the magnet and the first surface of the first strip being thin enough to allow objects to be magnetically attached to the first surface by the resultant magnetic pull;

wherein the power tool attachment includes a plurality of magnets disposed at each end of the length of the first strip;

wherein each end of the first strip further includes a malleable metallic support frame defining a ridge or lip at the ends of the strip to prevent magnetically attached accessories from detaching from the strip.

* * * * *